US012675904B2

(12) United States Patent
Wang et al.

(10) Patent No.: US 12,675,904 B2
(45) Date of Patent: Jul. 7, 2026

(54) SPATIAL MAP INFORMATION GENERATING APPARATUS, METHOD, AND COORDINATE SYSTEM INTEGRATING APPARATUS

(71) Applicant: HTC Corporation, Taoyuan City (TW)

(72) Inventors: Yun-Ting Wang, Taoyuan City (TW); Hung-Lung Huang, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 283 days.

(21) Appl. No.: 18/539,277

(22) Filed: Dec. 14, 2023

(65) Prior Publication Data

US 2025/0200794 A1 Jun. 19, 2025

(51) Int. Cl.
*G06T 7/73* (2017.01)

(52) U.S. Cl.
CPC ...................................... *G06T 7/74* (2017.01)

(58) Field of Classification Search
CPC ...................................................... G06T 7/74
See application file for complete search history.

(56) References Cited

U.S. PATENT DOCUMENTS

| | | | | |
|---|---|---|---|---|
| 9,685,003 | B2 * | 6/2017 | Lazarow | G06T 19/006 |
| 11,113,894 | B1 * | 9/2021 | Price | G06F 3/012 |
| 12,189,869 | B1 * | 1/2025 | Liu | G06T 7/73 |
| 2014/0119598 | A1 | 5/2014 | Ramachandran et al. | |
| 2016/0179830 | A1 | 6/2016 | Schmalstieg et al. | |

| | | | | |
|---|---|---|---|---|
| 2018/0285052 | A1 * | 10/2018 | Eade | G06F 3/1423 |
| 2020/0034624 | A1 * | 1/2020 | Sharma | G06F 1/1688 |
| 2021/0264674 | A1 * | 8/2021 | Shahrokni | G06F 3/013 |
| 2021/0279949 | A1 * | 9/2021 | Cao | G06T 17/00 |
| 2021/0279953 | A1 * | 9/2021 | Bouhnik | G06T 19/00 |
| 2021/0343087 | A1 * | 11/2021 | Gomez Gonzalez | G06F 3/013 |
| 2023/0137219 | A1 * | 5/2023 | Kim | H04N 7/157 |
| | | | | 348/43 |

FOREIGN PATENT DOCUMENTS

| | | |
|---|---|---|
| CN | 111880644 A | 11/2020 |
| CN | 114494612 A | 5/2022 |

OTHER PUBLICATIONS

Azimi, A., Hosseininaveh, A., & Remondino, F. (2022). a novel geometric key-frame selection method for visual-inertial slam and odometry systems. The International Archives of the Photogrammetry, Remote Sensing and Spatial Information Sciences, 43, 9-14. (Year: 2022).*

(Continued)

*Primary Examiner* — Ian L Lemieux
(74) *Attorney, Agent, or Firm* — CKC & Partners Co., LLC

(57) ABSTRACT

A spatial map information generating apparatus, method, and coordinate system integrating apparatus are provided. The apparatus receives a plurality of keyframes, and the keyframes are generated by a plurality of apparatuses located in a plurality of boundary regions. The apparatus compares the keyframes to obtain a plurality of similar keyframes corresponding to at least one overlapping area of the boundary regions. The apparatus integrates the similar keyframes corresponding to the at least one overlapping area to generate spatial map information corresponding to the boundary regions.

16 Claims, 8 Drawing Sheets

(56) References Cited

OTHER PUBLICATIONS

Aditya Dhakal et al., "SLAM-share: visual simultaneous localization and mapping for real-time multi-user augmented reality", Proceedings of the 2nd International Workshop on Interactive Multimedia Retrieval, ACMPUB27, New York, NY, USA, Nov. 30, 2022 (Nov. 30, 2022), pp. 293-306, XP058959718, DOI: 10.1145/3555050.3569142.

The search report of the corresponding European application No. EP 24170799.1 issued on Oct. 15, 2024.

Tetsuya Idota, "Decentralized Multi-Robot Slam and Ad Hoc Network for Exploration in a Remote and Enclosed Environment," A Dissertation Submitted to the Graduate Division of the University of Hawai'i at Manoa in Partial Fulfillment of the Requirements for the Degree of Doctor of Philosophy in Computer Science, May 2022.

Sunil, Sooraj et al., "Feature-Based Occupancy Map-Merging for Collaborative SLAM," Sensors 23, 2023, No. 6: 3114. https://doi.org/10.3390/s23063114, Published on Mar. 14, 2023.

Ankit A. Ravankar et al., "Multi-robot Mapping and Navigation using Topological Features", Proceedings 2019, 2019, 6; doi: 10.3390/proceedings2019010006, Published on Nov. 14, 2019.

* cited by examiner

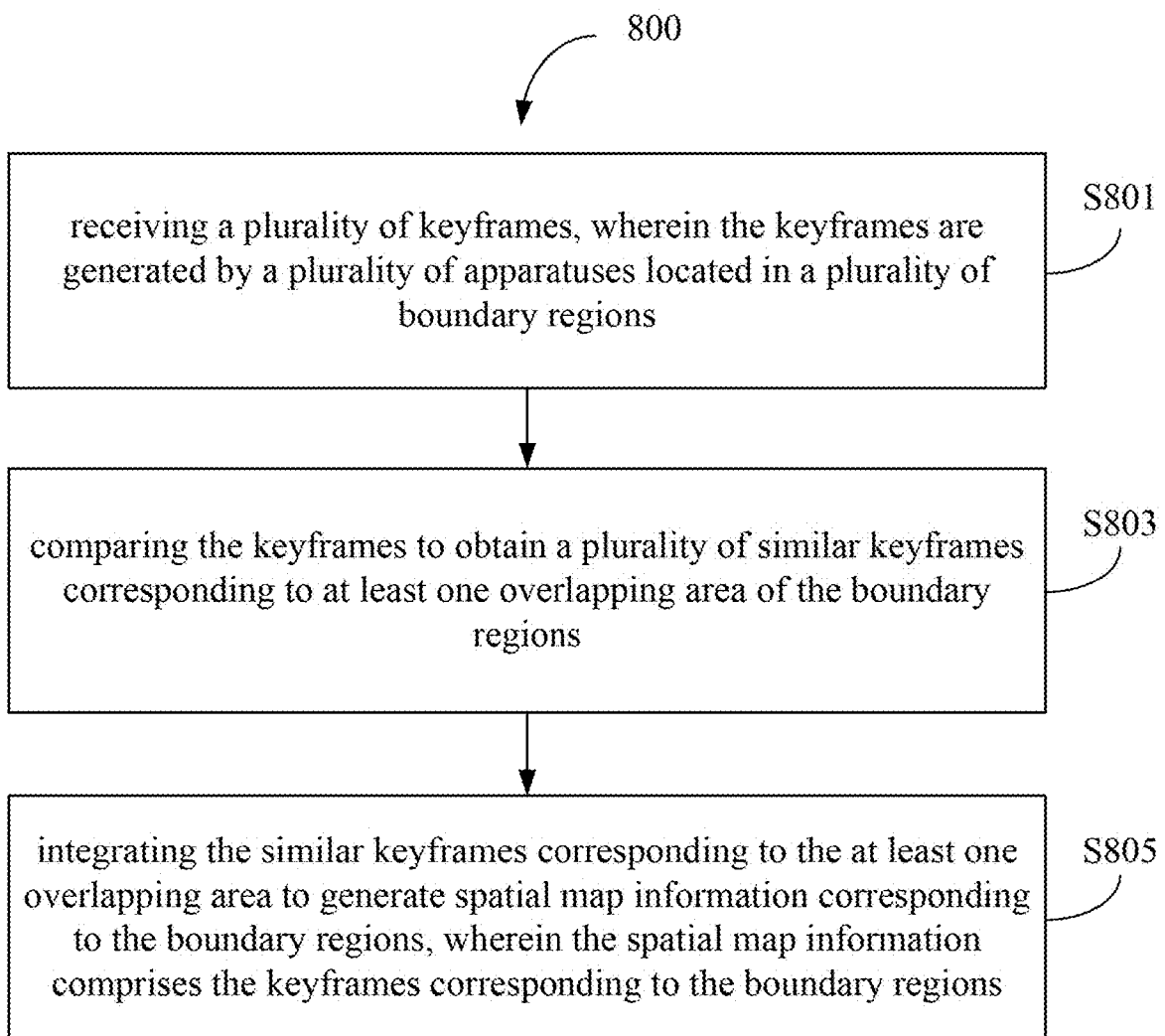

receiving a plurality of keyframes, wherein the keyframes are generated by a plurality of apparatuses located in a plurality of boundary regions — S801 comparing the keyframes to obtain a plurality of similar keyframes corresponding to at least one overlapping area of the boundary regions — S803 integrating the similar keyframes corresponding to the at least one overlapping area to generate spatial map information corresponding to the boundary regions, wherein the spatial map information comprises the keyframes corresponding to the boundary regions — S805

FIG. 8

SPATIAL MAP INFORMATION GENERATING APPARATUS, METHOD, AND COORDINATE SYSTEM INTEGRATING APPARATUS

BACKGROUND

Field of Invention

The present invention relates to a spatial map information generating apparatus, method, and coordinate system integrating apparatus. More particularly, the present invention relates to a spatial map information generating apparatus, method, and coordinate system integrating apparatus that can quickly generate a spatial map and integrate a coordinate system.

Description of Related Art

In recent years, various technologies related to virtual reality have developed rapidly, and various technologies and applications have been proposed one after another.

Generally speaking, when a user experiences a virtual reality application, the apparatus (e.g., a head-mounted display worn by the user) needs to establish a spatial map to provide a good user experience. However, in the prior art, the apparatus needs to spend a lot of time to build a spatial map (e.g., passing through the entire area environment through a single apparatus) in a large-area environment. In addition, it is usually difficult to confirm the overall quality and completeness of the spatial map when a spatial map is created by using a single apparatus alone.

In addition, when multiple users use apparatuses in the same field, if they want to interact with each other in the virtual world, they need to calibrate the coordinate systems of each other's apparatuses to reduce alignment errors. In the prior art, the apparatus is required to achieve transformation between the coordinate system of the user's operating apparatus and the coordinate system of the target object by observing a specific target object (e.g., Aruco markers, controller poses, hand poses). However, the aforementioned method requires setting additional location markers in the spatial map environment to provide additional location information, which increases the operation cost.

Accordingly, there is an urgent need for a coordinate system offset calculating technology that can quickly generate a spatial map and integrate a coordinate system.

SUMMARY

An objective of the present disclosure is to provide a spatial map information generating apparatus. The spatial map information generating apparatus comprises a transceiver interface and a processor, and the processor is electrically connected to the transceiver interface. The processor receives a plurality of keyframes, wherein the keyframes are generated by a plurality of apparatuses located in a plurality of boundary regions. The processor compares the keyframes to obtain a plurality of similar keyframes corresponding to at least one overlapping area of the boundary regions. The processor integrates the similar keyframes corresponding to the at least one overlapping area to generate spatial map information corresponding to the boundary regions, wherein the spatial map information comprises the keyframes corresponding to the boundary regions.

Another objective of the present disclosure is to provide a spatial map information generating method, which is adapted for use in an electronic apparatus. The spatial map information generating method comprises the following steps: receiving a plurality of keyframes, wherein the keyframes are generated by a plurality of apparatuses located in a plurality of boundary regions; comparing the keyframes to obtain a plurality of similar keyframes corresponding to at least one overlapping area of the boundary regions; and integrating the similar keyframes corresponding to the at least one overlapping area to generate spatial map information corresponding to the boundary regions, wherein the spatial map information comprises the keyframes corresponding to the boundary regions.

A further objective of the present disclosure is to provide a coordinate system integrating apparatus. The coordinate system integrating apparatus comprises a transceiver interface and a processor, and the processor is electrically connected to the transceiver interface. The processor receives a plurality of keyframes, wherein the keyframes are generated by a plurality of apparatuses located in a plurality of boundary regions. The processor compares the keyframes to obtain a plurality of similar keyframes corresponding to at least one overlapping area of the boundary regions. The processor calculates a standard coordinate system based on a plurality of feature points comprised in the similar keyframes, wherein the feature points are located in the at least one overlapping area. The processor transmits the standard coordinate system to the apparatuses to make the apparatuses perform a coordinate system calibration operation based on the feature points and the standard coordinate system.

According to the above descriptions, the spatial map information generating technology (at least including the apparatus and the method) provided by the present disclosure compares a plurality of keyframes generated by apparatuses from a plurality of boundary regions, and integrate the keyframes of the overlapping area with the keyframes of other non-overlapping areas to generate spatial map information corresponding to the boundary regions. In addition, the spatial map information generation technology provided by the present disclosure can also calculate a standard coordinate system based on a plurality of feature points comprised in the keyframes of the overlapping area, so that the apparatuses in the space can perform corresponding coordinate system calibration operations based on the standard coordinate system. The spatial map information generation technology provided by the present disclosure can quickly create a spatial map and integrate the coordinate systems of each apparatus in the space without setting additional position markers in the environment, thus solving the shortcomings of the conventional technology.

The detailed technology and preferred embodiments implemented for the subject disclosure are described in the following paragraphs accompanying the appended drawings for people skilled in this field to well appreciate the features of the claimed invention.

BRIEF DESCRIPTION OF THE DRAWINGS

FIG. 8 is a partial flowchart depicting a spatial map information generating method of the third embodiment.

DETAILED DESCRIPTION

In the following description, a spatial map information generating apparatus, method, and coordinate system integrating apparatus according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
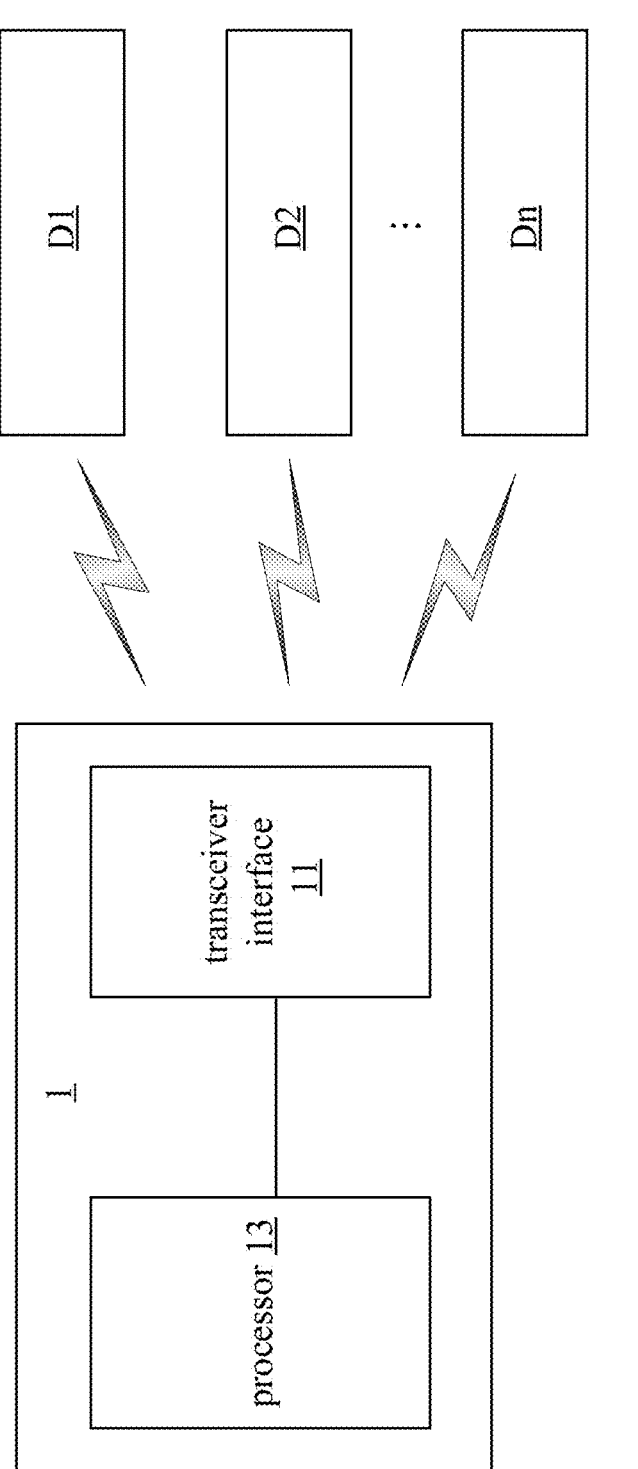
FIG. 1 is a schematic view depicting a spatial map information generating apparatus of the first embodiment.

A first embodiment of the present disclosure is a spatial map information generating apparatus 1 and a schematic view of which is depicted in FIG. 1. In the present embodiment, the spatial map information generating apparatus 1 comprises a transceiver interface 11 and a processor 13, and the processor 13 is electrically connected to the transceiver interface 11.

It shall be appreciated that the processor 13 may be any of various processors, Central Processing Units (CPUs), microprocessors, digital signal processors or other computing apparatuses known to those of ordinary skill in the art. The transceiver interface 11 is an interface capable of receiving and transmitting data or other interfaces capable of receiving and transmitting data and known to those of ordinary skill in the art.

As shown in FIG. 1, the transceiver interface 11 can be directly connected to a plurality of apparatuses D1, D2, . . . , Dn through communication, where n is a positive integer. In some embodiments, the transceiver interface 11 of the spatial map information generating apparatus 1 can be connected to the apparatuses D1, D2, . . . , Dn through communication with other devices.

In some embodiments, the apparatuses D1, D2, . . . , Dn may have an image capturing function (e.g., a plurality of depth camera lenses) to generate a plurality of real-time images (i.e., image frames) corresponding to a field of view (FOV) to perform an inside-out self-positioning tracking operation.

For example, the apparatuses D1, D2, . . . , Dn can be head-mounted devices (e.g., Head Mounted Display (HMD)) used by a user in a physical space to perform virtual reality operations corresponding to the three-dimensional space of the physical space.

Figure 2:
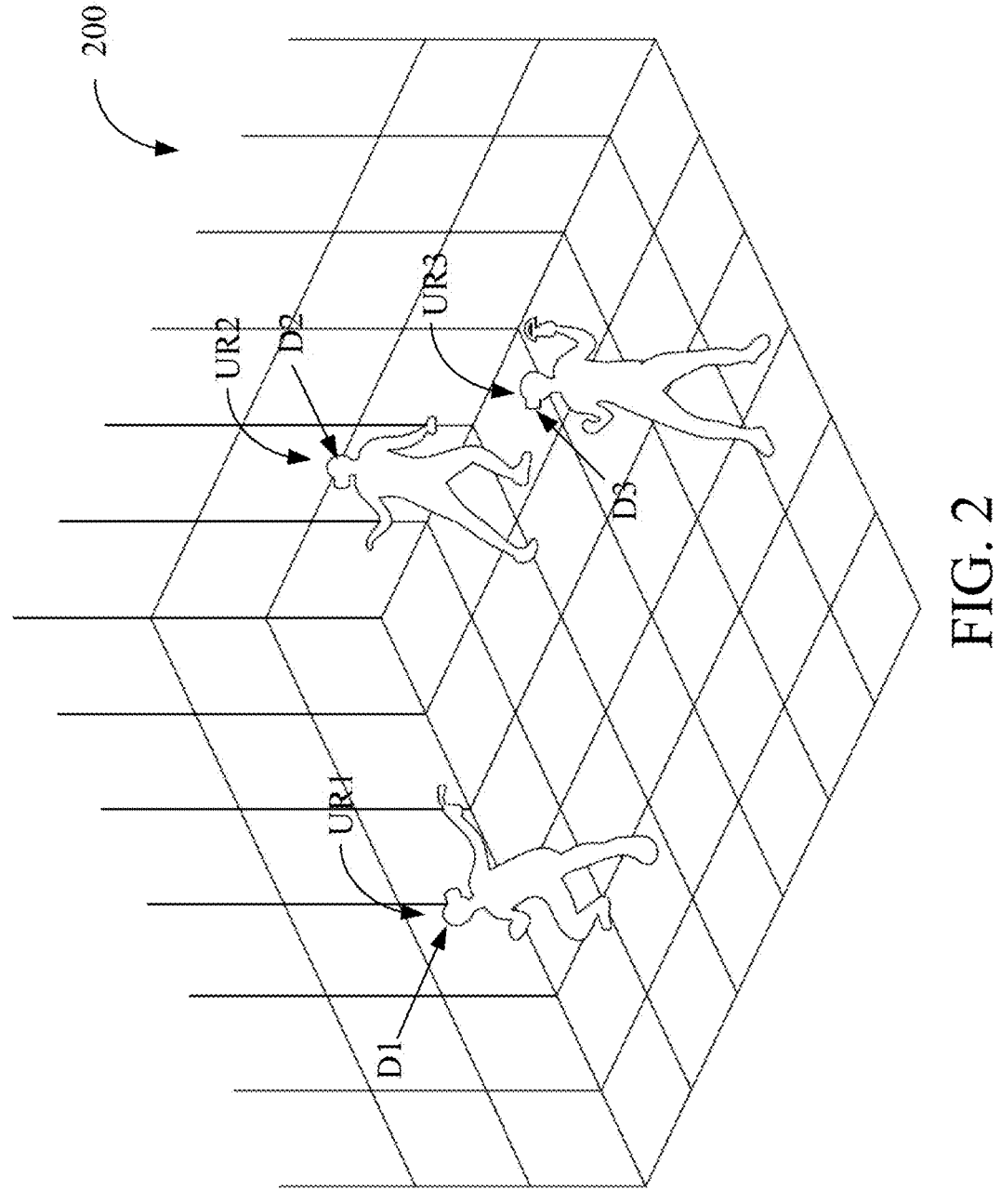
FIG. 2 is a schematic view depicting a application environment of some embodiment.

For ease of understanding, please refer to the schematic view of the application environment of the present disclosure in FIG. 2. As shown in FIG. 2, in the physical space 200, the user UR1, the user UR2, and the user UR3 respectively operate the apparatus D1, the apparatus D2, and the apparatus D3 (e.g., a head-mounted device).

It shall be appreciated that in some embodiments, the spatial map information generating apparatus 1 can be an external device (e.g., a remote computing device) installed outside the physical space, and the apparatuses D1, D2, . . . , Dn transmit their data to the external device to perform correspondence. computing and services. In some implementations, one of the apparatus D1, D2, . . . , Dn can also be selected as the spatial map information generating apparatus 1.

For ease of understanding, the following description will be described based on the user UR1, the user UR2, the user UR3 and the apparatuses D1, D2, and D3 they operate respectively as shown in FIG. 2 to FIG. 6. Those with ordinary knowledge in the art should be able to understand other implementations with other amount of apparatus based on the descriptions of the present disclosure, so no further details are given here.

In the present embodiment, each of the apparatuses D1, D2, and D3 of the present disclosure has a corresponding boundary region, and the user can perform activities in the boundary region defined by each apparatus. It shall be appreciated that the boundary region can be predefined or dynamically adjusted according to the user's operations.

Figure 3:
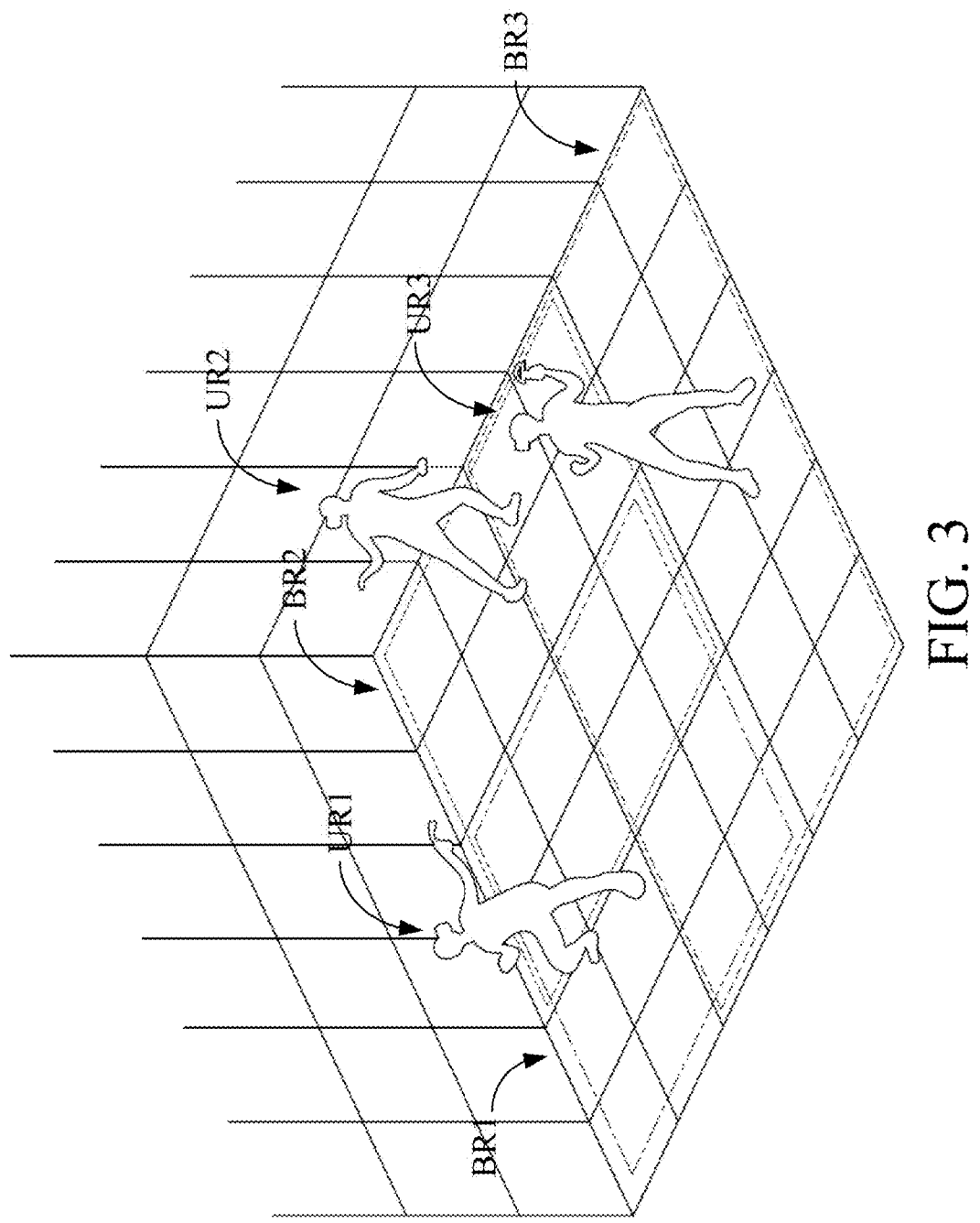
FIG. 3 is a schematic view depicting boundary regions of some embodiments.

For ease of understanding, please refer to the schematic view of the boundary regions in FIG. 3. As shown in FIG. 3, the apparatus D1 operated by user UR1 corresponds to the boundary region BR1 of 4×4 block size, the apparatus D2 operated by user UR2 corresponds to the boundary region BR2 of 4×4 block size, and the apparatus D3 operated by user UR3 corresponds to the boundary region BR3 of 6×4 block size.

It shall be appreciated that when the apparatuses D1, D2, and D3 are operating, the apparatus D1, D2, and D3 can continue to generate image frames corresponding to their respective boundary regions, so that the apparatuses can continue to perform inside-out self-positioning tracking operations.

In addition, in the present disclosure, each apparatus D1, D2, and D3 can determine a plurality of keyframes from these generated image frames to make positioning operations and map creation operations more accurate. For example, the determination of these keyframes can be based on a specific time (e.g., recording every 10 seconds), the change of feature points in the image frame, or the degree of loss of the tracking target.

In the present embodiment, the processor 13 can receive a plurality of keyframes from the apparatuses D1, D2, and D3, and these keyframes are generated by the apparatuses D1, D2, and D3 located in the boundary regions BR1, BR2, and BR3.

It shall be appreciated that since the apparatuses D1, D2, and D3 continue to generate the keyframes from their respective boundary regions, each of the keyframes can correspond to a feature position in the boundary region (e.g., spatial features in the environment). In addition, based on different operation methods, each of the keyframes may comprise information such as: descriptors, feature points, capturing position information, images, etc.

Next, in the present embodiment, the processor 13 compares the keyframes to obtain a plurality of similar keyframes corresponding to at least one overlapping area of the boundary regions.

In some embodiments, the processor 13 may obtain the similar keyframes from the keyframes by comparing a descriptor of each of the keyframes. For example, the processor 13 can determine whether the keyframes are similar keyframes by comparing whether the feature codes of the descriptors corresponding to the keyframes are similar.

It shall be appreciated that since similar keyframes record similar feature codes (i.e., descriptions of feature points of the images), the processor 13 can determine the overlapping area of these boundary regions through similar keyframes.

Finally, in the present embodiment, the processor 13 integrates the similar keyframes corresponding to the at least one overlapping area to generate spatial map information corresponding to the boundary regions, and the spatial map information comprises corresponding the keyframes corresponding to the boundary regions.

It shall be appreciated that the similar keyframes corresponding to the same overlapping area may record similar feature content (e.g., the spatial features in the environment) and positioning information. Therefore, in order to reduce the number of keyframes containing duplicate information in the spatial map information, the processor 13 can integrate keyframes in overlapping areas to save transmission and computing resources consumed by the apparatus.

Figure 4:
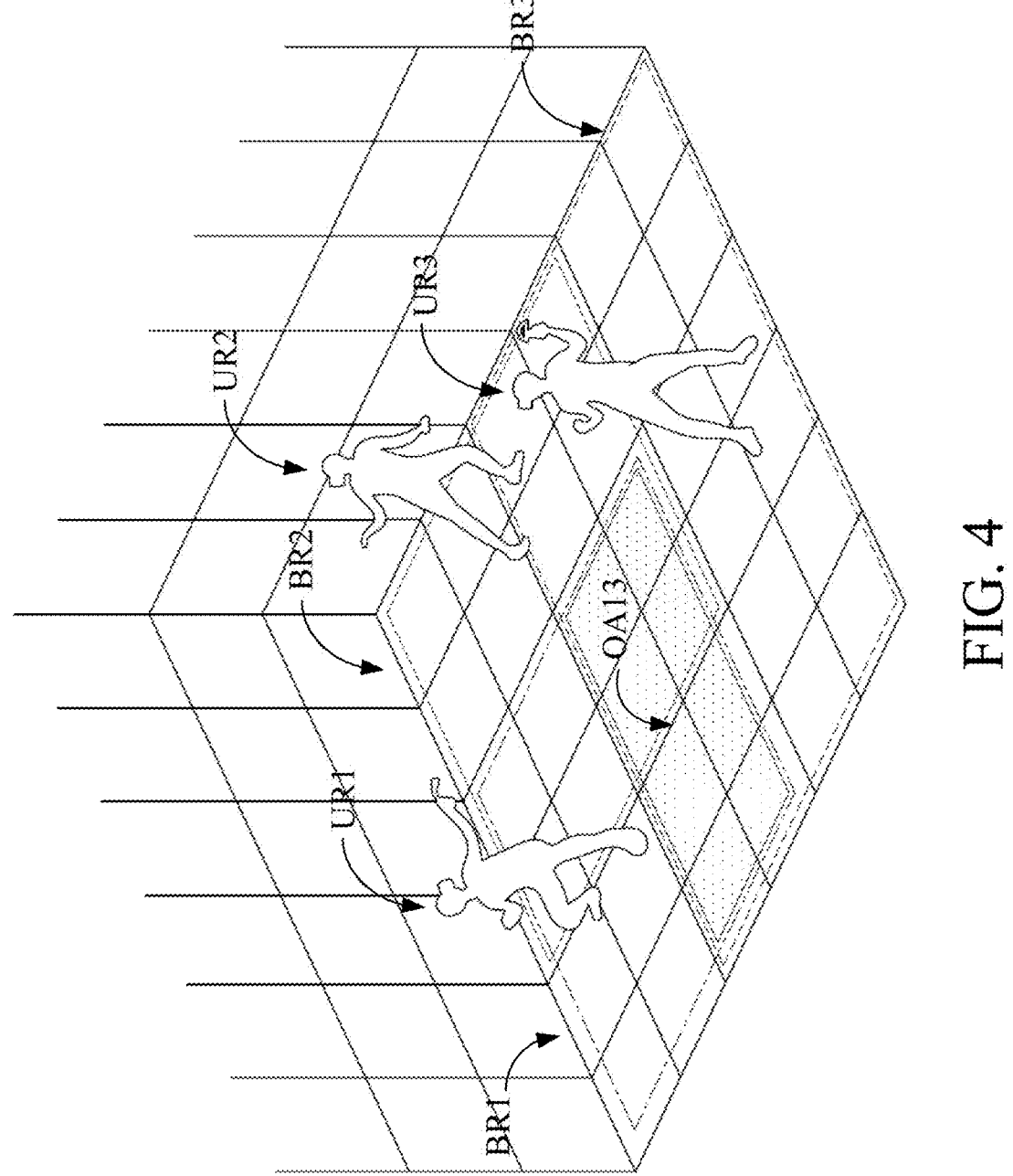
FIG. 4 is a schematic view depicting overlapping areas of some embodiments.

For ease of understanding, the overlapping area corresponding to the boundary regions BR1 and BR3 is taken as an example. As shown in FIG. 4, the processor 13 may obtain the similar keyframes corresponding to the overlapping area OA13 of the boundary regions BR1 and BR3 based on the comparison of the keyframes (i.e., the similar keyframes have similar descriptors), and select the keyframes with better quality from the similar keyframes as the keyframes representing the overlapping area OA13.

In some embodiments, the processor 13 may select the one with better quality from similar keyframes as the representative keyframe through the feature point status, and combine it with the keyframes of other non-overlapping areas to generate the spatial map information corresponding to the boundary regions. Specifically, the processor 13 performs the following operations for the similar keyframes in each of the at least one overlapping area: selecting at least one representative keyframe corresponding to the at least one overlapping area from the similar keyframes based on a feature point status of each of the similar keyframes. Next, the processor 13 generates the spatial map information corresponding to the boundary regions based on the at least one representative keyframe and the keyframes of each of the at least one overlapping area.

In some embodiments, the feature point status comprises a number of feature points and a distribution uniformity of feature points. It shall be appreciated that when the feature point status contains a higher number of feature points and a higher distribution uniformity of the feature points, the quality corresponding to the feature point status is better.

In some embodiments, the processor 13 may transmit the generated spatial map information to the apparatuses D1, D2, and D3 for utilization (e.g., generating spatial maps, performing virtual reality operations, performing the tracking operations, etc.). For example, the processor 13 transmits the spatial map information to the apparatuses D1, D2, and D3 to make the apparatuses D1, D2, and D3 have a complete spatial map corresponding to an activity space based on the spatial map information.

Figure 5:
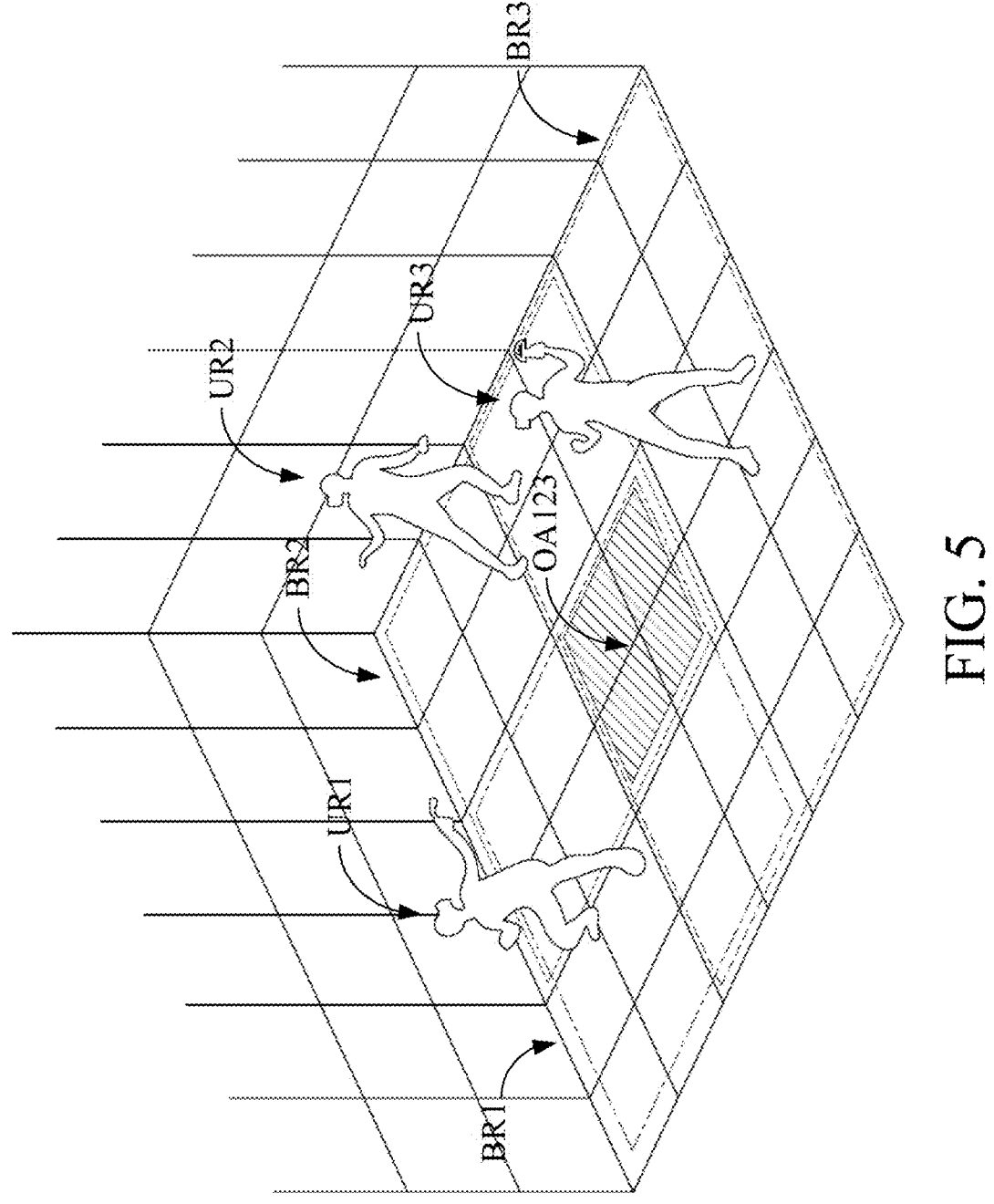
FIG. 5 is a schematic view depicting overlapping areas of some embodiments.

In some embodiments, as shown in FIG. 5, since the boundary regions BR1, BR2, and BR3 may comprise the overlapping area OA123, the apparatuses D1, D2, and D3 can see the same environmental features in the overlapping area OA123 (e.g., the feature points comprised in the similar keyframes generated by the apparatuses D1, D2, and D3). Therefore, the processor 13 may calibrate the corresponding coordinate systems of each of the apparatuses D1, D2, and D3 through the plurality of feature points comprised in the similar keyframes (i.e., corresponding to the same new coordinate system).

Figure 6:
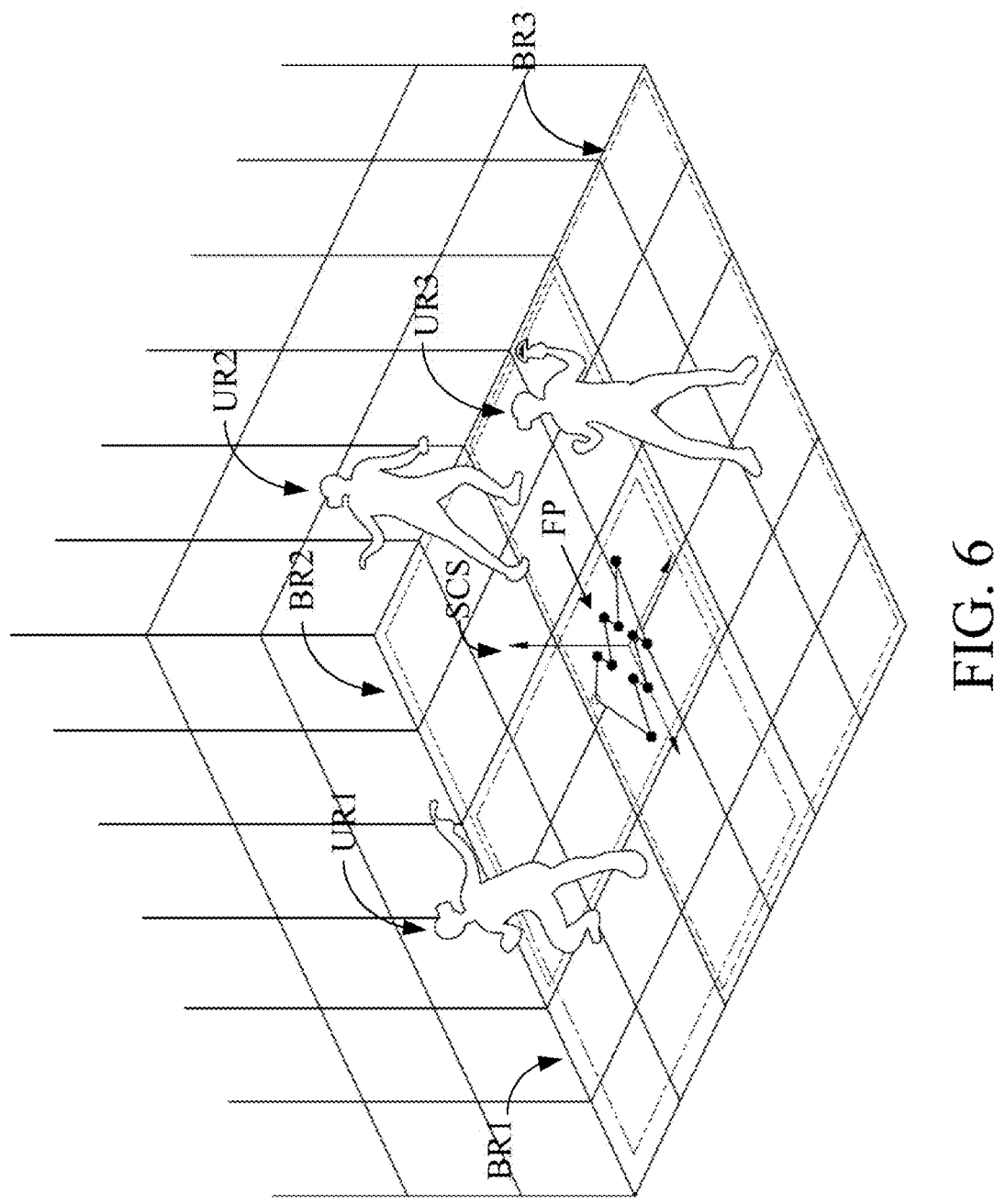
FIG. 6 is a schematic view depicting a standard coordinate system of some embodiments.

Specifically, as shown in FIG. 6, the processor 13 calculates a standard coordinate system SCS (i.e., a new standard coordinate system is generated in the overlapping area OA123) based on a plurality of feature points FP comprised in the similar keyframes, and the feature points FP are located in the at least one overlapping area. (i.e., overlapping area OA123). Next, the processor 13 transmits the standard coordinate system SCS to the apparatuses D1, D2, and D3 to make the apparatuses D1, D2, and D3 perform a coordinate system calibration operation based on the feature points FP and the standard coordinate system SCS.

It shall be appreciated that since the apparatuses D1, D2, and D3 can all see the feature points FP and the standard coordinate system SCS in the overlapping area OA123, the apparatuses D1, D2, and D3 may calculate the coordinate system offset between their own coordinate systems and the standard coordinate system SCS.

In some embodiments, the coordinate system offset can be represented by a transformation matrix for performing a transformation operation. For example, the processor 13 may transform the coordinate values from the second coordinate system to the first coordinate system through the transformation matrix.

In some embodiments, in order to save transmission consumption, the processor 13 may obtain the feature points FP corresponding to the similar keyframes from the apparatuses D1, D2, and D3 after confirming the similar keyframes. Specifically, the processor 13 transmits a report signal to the apparatuses corresponding to the similar keyframes (e.g., apparatuses D1, D2 or D3), and the report signal is configured to instruct the apparatuses to obtain the feature points FP comprised in the similar keyframes. Next, the processor 13 receives the feature points FP corresponding to the similar keyframes from the apparatuses.

In some embodiments, the processor 13 selects a first feature point with the highest feature value (i.e., the feature point that is most obviously different from the surrounding environment) from the feature points FP as an origin of the standard coordinate system SCS.

In some embodiments, the processor 13 calculates a center point of the feature points FP based on a distribution position of each of the feature points FP. Next, the processor 13 selects the center point of the feature points FP as an origin of the standard coordinate system SCS.

In some embodiments, each of the apparatuses D1, D2, and D3 is a head-mounted device having a camera device, and one of the apparatuses D1, D2, and D3 is used as the spatial map information generating apparatus 1.

According to the above descriptions, the spatial map information generating apparatus 1 provided by the present disclosure compares a plurality of keyframes generated by apparatuses from a plurality of boundary regions, and integrate the keyframes of the overlapping area with the keyframes of other non-overlapping areas to generate spatial map information corresponding to the boundary regions. In addition, the spatial map information generating apparatus 1 provided by the present disclosure can also calculate a standard coordinate system based on a plurality of feature points comprised in the keyframes of the overlapping area, so that the apparatuses in the space can perform corresponding coordinate system calibration operations based on the standard coordinate system. The spatial map information generating apparatus 1 provided by the present disclosure can quickly create a spatial map and integrate the coordinate systems of each apparatus in the space without setting additional position markers in the environment, thus solving the shortcomings of the conventional technology.

Figure 7:
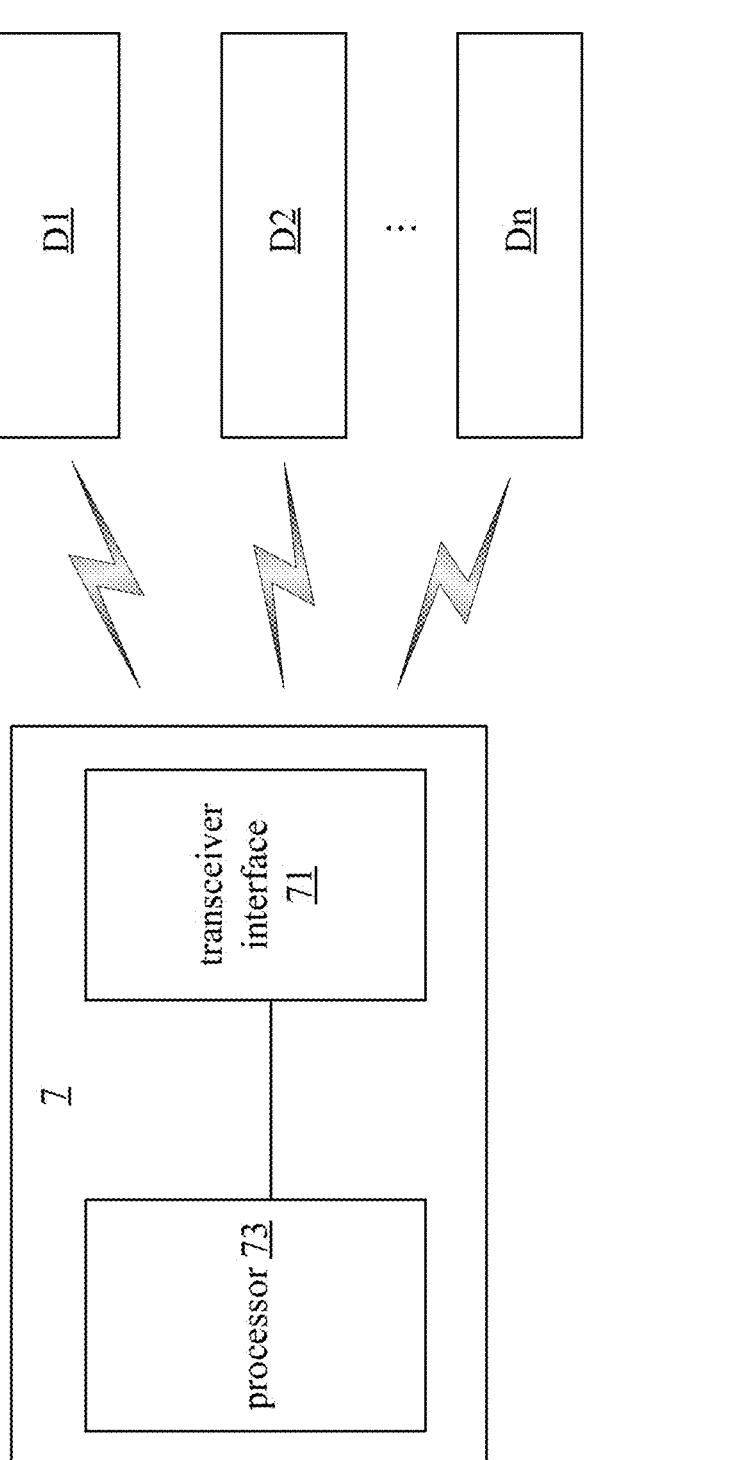
FIG. 7 is a schematic view depicting a coordinate system integrating apparatus of the second embodiment.

A second embodiment of the present disclosure is a coordinate system integrating apparatus 7 and a schematic view of which is depicted in FIG. 7. In the present embodiment, the coordinate system integrating apparatus 7 comprises a transceiver interface 71 and a processor 73, and the processor 73 is electrically connected to the transceiver interface 71, the transceiver interface 71 can be directly connected to a plurality of apparatuses D1, D2, . . . , Dn through communication, where n is a positive integer. In addition, since the implementation of the transceiver interface 71 and the processor 73 is similar to that of the transceiver interface 11 and the processor 13 in the spatial map information generating apparatus 1, no further description is given.

Since some operations of the coordinate system integrating apparatus 7 are similar to the spatial map information generating apparatus 1 in the first embodiment, for ease of understanding, only the different operations will be described below.

In the present embodiment, the processor 73 receives a plurality of keyframes, and the keyframes are generated by a plurality of apparatuses located in a plurality of boundary regions. Next, the processor 73 compares the keyframes to obtain a plurality of similar keyframes corresponding to at least one overlapping area of the boundary regions.

Next, the processor 73 calculates a standard coordinate system based on a plurality of feature points comprised in the similar keyframes, and the feature points are located in the at least one overlapping area. Finally, the processor 73 transmits the standard coordinate system to the apparatuses to make the apparatuses perform a coordinate system calibration operation based on the feature points and the standard coordinate system.

In addition to the aforesaid steps, the second embodiment can also execute all the operations and steps of the spatial map information generating apparatus 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

A third embodiment of the present disclosure is a spatial map information generating method and a flowchart thereof is depicted in FIG. 8. The spatial map information generating method 800 is adapted for an electronic apparatus (e.g., the spatial map information generating apparatus 1 of the first embodiment). The spatial map information generating method 800 generates spatial map information through the steps S801 to S805.

In the step S801, the electronic apparatus receives a plurality of keyframes, wherein the keyframes are generated by a plurality of apparatuses located in a plurality of boundary regions.

Next, in the step S803, the electronic apparatus compares the keyframes to obtain a plurality of similar keyframes corresponding to at least one overlapping area of the boundary regions. Finally, in the step S805, the electronic apparatus integrates the similar keyframes corresponding to the at least one overlapping area to generate spatial map information corresponding to the boundary regions, wherein the spatial map information comprises the keyframes corresponding to the boundary regions.

In some embodiments, wherein the step of obtaining the similar keyframes further comprises the following steps: comparing a descriptor of each of the keyframes to obtain the similar keyframes from the keyframes, wherein the similar keyframes correspond to the at least one overlapping area of the boundary regions.

In some embodiments, wherein the step of generating the spatial map information further comprises the following steps: performing the following operations for the similar keyframes in each of the at least one overlapping area: selecting at least one representative keyframe corresponding to the at least one overlapping area from the similar keyframes based on a feature point status of each of the similar keyframes; generating the spatial map information corresponding to the boundary regions based on the at least one representative keyframe and the keyframes of each of the at least one overlapping area.

In some embodiments, wherein the feature point status comprises a number of feature points and a distribution uniformity of feature points.

In some embodiments, the spatial map information generating method 800 further comprises the following steps: transmitting the spatial map information to the apparatuses to make the apparatuses have a complete spatial map corresponding to an activity space based on the spatial map information.

In some embodiments, the spatial map information generating method 800 further comprises the following steps: calculating a standard coordinate system based on a plurality of feature points comprised in the similar keyframes, wherein the feature points are located in the at least one overlapping area; and transmitting the standard coordinate system to the apparatuses to make the apparatuses perform a coordinate system calibration operation based on the feature points and the standard coordinate system.

In some embodiments, the spatial map information generating method 800 further comprises the following steps: transmitting a report signal to the apparatuses corresponding to the similar keyframes, wherein the report signal is configured to instruct the apparatuses to obtain the feature points FP comprised in the similar keyframes; and receiving the feature points corresponding to the similar keyframes from the apparatuses.

In some embodiments, the spatial map information generating method 800 further comprises the following steps: selecting a first feature point with the highest feature value from the feature points as an origin of the standard coordinate system.

In some embodiments, the spatial map information generating method 800 further comprises the following steps: calculating a center point of the feature points based on a distribution position of each of the feature points; and selecting the center point of the feature points as a origin of the standard coordinate system.

In addition to the aforesaid steps, the third embodiment can also execute all the operations and steps of the spatial map information generating apparatus 1 set forth in the first embodiment, have the same functions, and deliver the same technical effects as the first embodiment. How the third embodiment executes these operations and steps, has the same functions, and delivers the same technical effects will be readily appreciated by those of ordinary skill in the art based on the explanation of the first embodiment. Therefore, the details will not be repeated herein.

The spatial map information generating method described in the third embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the spatial map information generating apparatus 1), the computer program executes the spatial map information generating method as described in the third embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

According to the above descriptions, the spatial map information generating technology (at least including the apparatus and the method) provided by the present disclosure compares a plurality of keyframes generated by apparatuses from a plurality of boundary regions, and integrate the keyframes of the overlapping area with the keyframes of other non-overlapping areas to generate spatial map information corresponding to the boundary regions. In addition, the spatial map information generation technology provided by the present disclosure can also calculate a standard coordinate system based on a plurality of feature points comprised in the keyframes of the overlapping area, so that the apparatuses in the space can perform corresponding coordinate system calibration operations based on the standard coordinate system. The spatial map information generation technology provided by the present disclosure can quickly create a spatial map and integrate the coordinate systems of each apparatus in the space without setting additional position markers in the environment, thus solving the shortcomings of the conventional technology.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A spatial map information generating apparatus, comprising:
 a transceiver interface; and
 a processor, being electrically connected to the transceiver interface, and being configured to perform operations comprising:

receiving a plurality of keyframes, wherein the plurality of keyframes are generated by a plurality of apparatuses located in a plurality of boundary regions;
 comparing the plurality of keyframes to obtain a plurality of similar keyframes corresponding to at least one overlapping area of the boundary regions; and
 integrating the plurality of similar keyframes corresponding to the at least one overlapping area to generate spatial map information corresponding to the boundary regions, wherein the spatial map information comprises the plurality of keyframes corresponding to the boundary regions, wherein the operation of generating the spatial map information further comprises the following operations:
 performing the following operations for the plurality of similar keyframes in each of the at least one overlapping area:
 selecting at least one representative keyframe corresponding to the at least one overlapping area from the plurality of similar keyframes based on a feature point status of each of the plurality of similar keyframes, wherein the feature point status comprises a number of feature points and a distribution uniformity of feature points; and
 generating the spatial map information corresponding to the boundary regions based on the at least one representative keyframe and the plurality of keyframes of each of the at least one overlapping area.

2. The spatial map information generating apparatus of claim 1, wherein the operation of obtaining the plurality of similar keyframes further comprises the following operations:
 comparing a descriptor of each of the plurality of keyframes to obtain the plurality of similar keyframes from the plurality of keyframes, wherein the plurality of similar keyframes correspond to the at least one overlapping area of the boundary regions.

3. The spatial map information generating apparatus of claim 1, wherein the processor is further configured to perform the following operations:
 transmitting the spatial map information to the apparatuses to make the apparatuses have a complete spatial map corresponding to an activity space based on the spatial map information.

4. The spatial map information generating apparatus of claim 1, wherein the processor is further configured to perform the following operations:
 calculating a standard coordinate system based on a plurality of feature points comprised in the plurality of similar keyframes, wherein the feature points are located in the at least one overlapping area; and
 transmitting the standard coordinate system to the apparatuses to make the apparatuses perform a coordinate system calibration operation based on the feature points and the standard coordinate system.

5. The spatial map information generating apparatus of claim 4, wherein the processor is further configured to perform the following operations:
 transmitting a report signal to the apparatuses corresponding to the plurality of similar keyframes, wherein the report signal is configured to instruct the apparatuses to obtain the feature points comprised in the plurality of similar keyframes; and
 receiving the feature points corresponding to the plurality of similar keyframes from the apparatuses.

6. The spatial map information generating apparatus of claim 4, wherein the processor is further configured to perform the following operations:

selecting a first feature point from the plurality of feature points as an origin of the standard coordinate system, wherein the first feature point that is most obviously different from a surrounding environment.

7. The spatial map information generating apparatus of claim 4, wherein the processor is further configured to perform the following operations:

calculating a center point of the feature points based on a distribution position of each of the feature points; and selecting the center point of the feature points as a origin of the standard coordinate system.

8. The spatial map information generating apparatus of claim 1, wherein each of the apparatuses is a head-mounted device having a camera device, and one of the apparatuses is used as the spatial map information generating apparatus.

9. A spatial map information generating method, being adapted for use in an electronic apparatus, and the spatial map information generating method comprises:

receiving a plurality of keyframes, wherein the plurality of keyframes are generated by a plurality of apparatuses located in a plurality of boundary regions;

comparing the plurality of keyframes to obtain a plurality of similar keyframes corresponding to at least one overlapping area of the boundary regions; and integrating the plurality of similar keyframes corresponding to the at least one overlapping area to generate spatial map information corresponding to the boundary regions, wherein the spatial map information comprises the plurality of keyframes corresponding to the boundary regions, wherein the step of generating the spatial map information further comprises the following steps:

performing the following operations for the plurality of similar keyframes in each of the at least one overlapping area:

selecting at least one representative keyframe corresponding to the at least one overlapping area from the plurality of similar keyframes based on a feature point status of each of the plurality of similar keyframes, wherein the feature point status comprises a number of feature points and a distribution uniformity of feature points; and generating the spatial map information corresponding to the boundary regions based on the at least one representative keyframe and the plurality of keyframes of each of the at least one overlapping area.

10. The spatial map information generating method of claim 9, wherein the step of obtaining the plurality of similar keyframes further comprises the following steps:

comparing a descriptor of each of the plurality of keyframes to obtain the plurality of similar keyframes from the keyframes, wherein the plurality of similar keyframes correspond to the at least one overlapping area of the boundary regions.

11. The spatial map information generating method of claim 9, wherein the spatial map information generating method further comprises the following steps:

transmitting the spatial map information to the apparatuses to make the apparatuses have a complete spatial map corresponding to an activity space based on the spatial map information.

12. The spatial map information generating method of claim 9, wherein the spatial map information generating method further comprises the following steps:

calculating a standard coordinate system based on a plurality of feature points comprised in the plurality of similar keyframes, wherein the feature points are located in the at least one overlapping area; and transmitting the standard coordinate system to the apparatuses to make the apparatuses perform a coordinate system calibration operation based on the feature points and the standard coordinate system.

13. The spatial map information generating method of claim 12, wherein the spatial map information generating method further comprises the following steps:

transmitting a report signal to the apparatuses corresponding to the plurality of similar keyframes, wherein the report signal is configured to instruct the apparatuses to obtain the feature points comprised in the plurality of similar keyframes; and receiving the feature points corresponding to the plurality of similar keyframes from the apparatuses.

14. The spatial map information generating method of claim 12, wherein the spatial map information generating method further comprises the following steps:

selecting a first feature point from the plurality of feature points as an origin of the standard coordinate system, wherein the first feature point that is most obviously different from a surrounding environment.

15. The spatial map information generating method of claim 12, wherein the spatial map information generating method further comprises the following steps:

calculating a center point of the feature points based on a distribution position of each of the feature points; and selecting the center point of the feature points as a origin of the standard coordinate system.

16. A coordinate system integrating apparatus, comprising:

a transceiver interface; and a processor, being electrically connected to the transceiver interface, and being configured to perform operations comprising:

receiving a plurality of keyframes, wherein the plurality of keyframes are generated by a plurality of apparatuses located in a plurality of boundary regions;

comparing the plurality of keyframes to obtain a plurality of similar keyframes corresponding to at least one overlapping area of the boundary regions; and calculating a standard coordinate system based on a plurality of feature points comprised in the plurality of similar keyframes, wherein the feature points are located in the at least one overlapping area; and transmitting the standard coordinate system to the apparatuses to make the apparatuses perform a coordinate system calibration operation based on the feature points and the standard coordinate system.

\* \* \* \* \*